Patented Apr. 22, 1952

2,593,554

UNITED STATES PATENT OFFICE 2,593,554

METHOD OF PRODUCING STEEL

Edward H. Graf, Cleveland, Ohio, assignor to Cleveland Steel Conditioner, Inc., Cleveland, Ohio, a corporation of Ohio No Drawing. Application March 15, 1949, Serial No. 81,631

3 Claims. (Cl. 75—53)

The present invention relates generally to the art of making steel and is more particularly concerned with a novel steel processing method, which is of special value and utility in connection with open hearth and electric furnace operations.

In the production of steel, pig iron is melted in the open hearth furnace or the electric furnace with the object of reducing its impurities, primarily silicon, manganese, phosphorous, sulphur and carbon. These impurities are oxidized and sulphurized along with small amounts of the iron and small particles of oxides and sulfides of manganese, silicon, and iron are formed. These oxide and sulfide particles, which are generally known and hereinafter referred to as "sonims," are widely distributed throughout the molten metal and their substantial removal therefrom is necessary if a steel having desirable strength properties is to be produced. Various methods of effecting this removal have been developed, but, to the best of my knowledge, there is still an insistent demand for a method whereby these steel-weakening particles can be more or less completely removed in an economical manner.

A still further difficulty of steel production, particularly by means of the open hearth furnace, is the effective inhibition or prevention of ferrous oxide formation throughout the heating and processing period. As those skilled in the art realize, the ferrous oxide content in an open hearth melt should desirably be maintained within relatively narrow limits. Without any special effective precautions, the oxidation of iron during the operation of an open hearth furnace results in the production of a larger than desirable amount of ferrous oxide. The heretofore known and used means of inhibiting ferrous oxide formation have been of limited effectiveness, and the methods of reducing the ferrous oxide chemically in furnaces have been expensive but customarily essential to the production of high quality steels.

My invention for the first time meets these problems and does so in an economical and efficient manner. It enables substantially complete removal of sonims from steel before the molten steel in the open hearth or electric furnace is removed from the furnace, thus eliminating the necessity for any special operations designed to remove sonim particles in the ladles or ingots, which operations are invariably more difficult and expensive to accomplish effectively than the process of this invention. Furthermore, the present process reduces by 80% the quantity of aluminum ordinarily added to the ladles as an essential operation in the production of steel by the open hearth or electric furnace process, and it eliminates the necessity for hot tops, thus enabling a very considerable economy in steel ingot production. Moreover, in melts treated in accordance with the process of this invention, the ferrous oxide content is readily maintained within permissible limits and usually no additions of deoxidizer to the melt in the furnace, ladle or mold are required to produce high quality steels.

This invention has still another advantage, when applied to the open hearth or the electric furnace, which not only is quite unexpected in view of the prior art, but is of great commercial significance. Time is money in large amounts in the steel industry and, according to my present method, very considerable amounts of time can be saved by shortening the length of steel refining operations. Normally, from one to four hours can be saved, for instance, in the usual open hearth heat. This result is obtained by removing impurities from the metal more rapidly and also by removing them, or some of them, simultaneously, where previously they were removed substantially in sequence.

My invention is predicated upon my surprising discovery that fused alumina of greater than 90% purity has the remarkable and heretofore unknown ability to sequester sonim particles in a metal melt and remove said particles from the melt to the slag, and to retain those particles in the slag for long periods. It is also predicated upon my equally surprising discovery that high purity fused alumina has the further remarkable and hitherto unknown ability to cause formation of ferrous sulfide and removal of sulphur in this form from the molten metal during the early stages of a heat and well in advance of the time that the lime is "up." The effectiveness of alumina for these purposes, of course, depends upon the amount used and the length of the period of contact between the melt and alumina.

Briefly stated, this invention therefore involves the use of a particular quantity of fused, crystalline alumina at least 90% pure, at a particular time in melts of the type encountered in open hearth and electric furnace practice.

I am aware that fused alumina of 85% purity or less has been employed in ladles to remove the sonim particles from the molten metal. This type of alumina, however, is not satisfactory in open hearth or electric furnaces for the same purpose.

In applying this invention to the open hearth practice, satisfactory results have been obtained by charging fused, crystalline alumina of about 94% purity into the furnace together with limestone, scrap steel and/or iron, and pig iron. In accordance with conventional open hearth practice, the metal, limestone and alumina in the furnace were heated for a period of about three hours, whereupon molten metal was added and heating was continued for an additional five hours. At the end of the heating period, the metal was poured from the furnace into ladles for subsequent teeming into molds.

Alloying materials and fused crystalline alumina may be added to the melt in the furnace from time to time. The difficulty in making such additions to the melt before the lime has been reduced to a fluid condition is considerable and I, therefore, prefer to make these additions after about the sixth hour of an ordinary heat, when the supernatant lime slag of the melt is relatively thin and will readily allow pieces of alloying material cast upon the surface of the slag to pass into the molten metal. The addition of alumina at this point in the heating operation is suitably accomplished after the manner of the addition of molybdenum oxide, that is by dropping a receptacle containing alumina upon the surface of the slag melt. While I prefer to make the addition of fused, crystalline alumina to the furnace before molten metal is added to the furnace or the metal in the furnace is reduced to a molten condition, and before a practically impenetrable cover of burnt lime overlies the metal melt, I contemplate the addition of alumina at any time up to within about two hours of the time when the metal is withdrawn from the furnace and cast in ladle or carried away to a Bessemer converter for further treatment in accordance with the Duplex process. If the addition of alumina to the furnace is made within less than about two hours of the pouring time, the resulting steel will not ordinarily be found to be substantially free of sonim particles. For some purposes not requiring especially high strengths of materials, steel produced by adding alumina at a point in the furnacing period less than two hours before the pouring time, will be satisfactory. This latter practice, of course, represents a waste of effective value of the alumina and is therefore to be avoided if practicably possible.

The amount of alumina charged will depend in part upon the quantity of sonim particles to be scavenged and removed from the metal, and in part upon the time when the addition of the alumina is made to the furnace. Thus, if alumina is not added within about one hour of pouring time, it may be necessary to employ twice as much alumina to obtain the same results as would have been obtained if the alumina were added at some time more than two hours before the pouring time. Generally, if the alumina is added as recommended, an amount of alumina $\frac{1}{5}$ as great as the amount of sonim particles to be removed from the metal will be adequate to accomplish scavenging action desired.

In the application of this invention to electric furnace practice, it has been my experience that addition of alumina should be made within a few minutes of the time when the first slag removal has been completed. Such addition, however, may be made at any time more than about two hours before pouring time, as in the aforementioned open hearth practice.

The progress of the scavenging operation in either open hearth of electric furnace may suitably be followed by periodic sampling of the metal and/or the slag of the molten melt, and additions of alumina may be made in accordance with the foregoing recommendations as to quantities and times.

Whether this said fused high purity alumina is charged to either the open hearth or the electric furnace in the beginning of process, or at some later stages, it is generally preferable that the alumina be in the form of chunks, i. e. pieces of approximately two to three cubic inches in size.

Where the alumina is charged in the early stages of the open hearth or electric furnace process, or constitutes a part of the initial charge in such process, an iron-aluminate slag of the spinel-type and having magnetic properties, is formed as soon as molten metal is provided for the necessary reaction. This slag is a ferroso-ferric-aluminate compound of the general formula $(Al_2O_3)_x.(FeO)_y.(Fe_2O_3)_z$ and, in addition to its properties mentioned above, is apparently a liquid at temperatures prevailing in molten metal in the open hearth or electric furnace. In any event, however, this slag compound is distributed substantially throughout the melt and it is readily attacked and broken down by sulfur with the result that sulfide of iron, i. e. iron pyrites, is formed. This ferrous sulfide, as indicated above, is eventually collected in the final lime slag and separated and removed from the metal melt therewith. A typical slag of this type, made in an electric furnace in accordance with this invention, had the following analysis:

|   | Per cent |
|---|---|
| $Fe_2O_3$ | 37.33 |
| MnO | 27.70 |
| $Al_2O_3$ | 16.69 |
| $SiO_2$ | 4.40 |
| S(as FeS) | 0.866 |
| $Cr_2O_3$ | 2.10 |
| $TiO_2$ | 0.18 |

This slag contained FeO and $Fe_3O_4$ but these constituents were reported as $Fe_2O_3$. The sulfur was determined to be in the form of ferrous sulfide. This fact in part accounts for the discrepancy in the above percentage total. Free iron entrained in the slag accounts for additional percentage.

At the same time that this sulfide synthesis is going on, the said magnetic slag compound is liquifying and sequestering or scavenging the sonium particles throughout the molten melt. These particles are carried to the surface of the melt by the slag and are securely retained there even after the formation of the finishing lime slag. Amorphous alumina, being incapable of combining with the ferrous oxide, remains on the surface as a sort of insulating blanket of solid material and serves no purpose so far as removal of sonim particles from the metal melt is concerned. In a sense, the amorphous alumina is not "wetted" by the molten metal. However, even if this amorphous alumina were to gain access to the molten metal, or even if it were distributed therethrough the results obtained in accordance with this invention would not be secured because no spinel-type, magnetic slag as is described above would thereby be produced.

The following illustrative examples of the present invention as I have actually successfully practiced it will enable those skilled in the art to gain a further understanding of said invention:

Example I

In an open hearth furnace operation begun at 12:00 a. m. 800 pounds of fused crystalline alumina of 94% purity was charged into a furnace along with 30,200 pounds of limestone, 25,800 pounds of sinter, 121,100 pounds of steel scrap, 260,000 pounds of molten pig iron, and 20,000 pounds of broken molds. The charge of the scrap metal was finished within three hours of the beginning of the charging operation and the hot metal was completely charged at 5:30 a. m. Melt samples were taken and analyzed at 4:45 a. m. and 5:30 a. m. After a flush finish at about 6:30 a. m. another melt sample was taken and analyzed, proving the presence of 0.055% sulfur in the metal. An hour later, another melt sample was taken, and the sulfur content of the metal was proven to be 0.048%. Eleven hours after the operation had begun, 15,000 pounds of molten metal was added to the furnace and ½ hour later another melt sample was taken showing 0.04% sulfur and 0.14% manganese in the metal. Twelve hours and 40 minutes after the charging began, the furnace was tapped and the metal was collected in ladles, where 4,000 pounds of 80% ferro-manganese was added together with 200 pounds of ferro-titanium and 770 pounds of anthracite coal. The final analysis of the rimmed steel product (ingot) was as follows: 0.22% carbon, 0.68% manganese, 0.033% sulfur and 0.014% phosphorous. The slag analysis at each of several times indicated above was as follows:

| Time | $SiO_2$ | $Al_2O_3$ | CaO | MgO | MnO | $P_2O_5$ | $TiO_2$ | S | $SO_3$ | FeO | $Fe_2O_3$ |
|---|---|---|---|---|---|---|---|---|---|---|---|
| 4:45 a. m. | 16.05 | 1.93 | 16.2 | 4.27 | 11.80 | 2.75 | 1.38 | .120 | .025 | 40.82 | 4.12 |
| 5:30 a. m. | 20.90 | 1.67 | 21.2 | 4.20 | 15.54 | 3.73 | 1.74 | .112 | .013 | 26.75 | 3.75 |
| 6:50 a. m. | 20.70 | 1.59 | 25.0 | 4.92 | 15.48 | 5.15 | 1.45 | .104 | .016 | 21.66 | 3.10 |
| 12:40 p. m. (Tap) | 10.05 | 2.43 | 42.6 | 8.52 | 4.90 | 1.74 | .43 | .168 | .092 | 20.56 | 8.04 |

The sulfur of the slag was determined to exist predominantly as ferrous sulfide, a total of 182 pounds of sulfur being removed from the metal during the heat and 117.6 pounds of this sulfur being in the form of iron derivative in the final slag.

Example II

In another open hearth furnace, operation begun at 12:15 a. m. 150,000 pounds of hot metal was charged into the furnace with 10,500 pounds of cold iron, 30,300 pounds of limestone, 130,500 pounds of steel scrap, the scrap charge being completed at 3:20 a. m. and the hot metal charge being completed at 4:40 a. m. At 8:40 a. m. 3,000 pounds of raw lime was charged into the furnace and five minutes later 6,000 pounds of iron ore was charged thereinto. At 10:00 a. m. an additional 3,000 pounds of raw lime was charged into the furnace and an hour later an additional 3,000 pounds of ore was charged. At 11:40 a. m. a melt sample was taken and analyzed showing 0.055% sulfur in the metal, ten minutes later 6,000 pounds of ore was charged into the furnace and in another hour another 3,000 pounds of ore was added. Whereupon a second melt sample was taken and the sulfur content of the metal again was proven to be 0.055%. At 1:15 p. m. a slag sample was taken and analyzed and 3,000 pounds more of iron ore were added to the furnace charge. Still another melt sample was taken at 1:40 p. m. and its analysis showed that a sulfur content was still 0.055%, that the metal contained 0.13% manganese. Ferro-manganese in the amount of 500 pounds was then charged. Fifteen minutes later 600 pounds fused crystalline alumina 94% purity in the form of chunks of an average of approximately two to three cubic inches in size was charged into the furnace in the amount of 600 pounds. At this time, the carbon content of the metal was determined to be 0.14%. A melt sample was taken twenty minutes later and showed on analysis that the metal contained 0.049% sulfur and 0.14% manganese. An additional 500 pounds of ferro-manganese was thereupon added to the furnace charge and at 2:45 p. m. the furnace was tapped. In the ladle, 1600 pounds of 80% ferro-manganese was added and the metal showed on final analysis the following constituency: 0.08% carbon, 0.45% manganese, 0.013% phosphorous and 0.049% sulfur. This was a rimmed steel. The slag analysis at each of the several times indicated above was as follows:

| Time | $SiO_2$ | $Al_2O_3$ | CaO | MgO | MnO | $P_2O_5$ | $TiO_2$ | S | $SO_3$ | FeO | $Fe_2O_3$ |
|---|---|---|---|---|---|---|---|---|---|---|---|
| 1:15 p. m. | 19.55 | 1.84 | 40.40 | 7.48 | 6.45 | 3.27 | .95 | .092 | .058 | 15.97 | 3.42 |
| 1:45 p. m. | 19.00 | 1.88 | 42.20 | 7.84 | 6.19 | 3.22 | .95 | .122 | .053 | 15.01 | 2.70 |
| 2:20 p. m. | 16.78 | 2.05 | 43.20 | 7.48 | 6.90 | 2.68 | .82 | .130 | .085 | 13.62 | 5.36 |
| 2:25 p. m. | 16.42 | 2.18 | 42.80 | 7.26 | 6.84 | 2.79 | .82 | .134 | .096 | 13.66 | 5.81 |

Comparison of the two heats described above reveals that as a direct result of this invention at least two hours was saved by bringing the high purity crystalline alumina into contact with the melt in the very early stages of the processing period. Presumably, considerably more than two hours' time was saved in the first example over conventional practice in which the said alumina would not have been heated at any time during the course of the heat. The very marked effect of the present invention is apparent upon further consideration of the second example wherein a sharp drop in sulfur content of the metal follows immediately upon the addition of the said alumina to the furnace charge.

These examples are in no way to be construed as imposing limitations upon the appended claims.

Wherever percentages, ratios, parts of amounts are recited herein or in the appended claims, the weight basis is referred unless the contrary is specifically stated.

This is a continuation-in-part of my application Serial No. 674,035, filed June 3, 1946, now abandoned.

Having thus described the present invention so that others skilled in the art may understand the same, I state that what I desire to obtain by Letters Patent is set out in what is claimed.

What is claimed is:

1. In the production of steel from pig iron, the step of heating molten pig iron free from lime-containing slag with fused, crystalline alumina of purity greater than 90% and producing a spinel-type, iron-aluminate slag, reacting said slag with sulphur associated with the iron and forming iron pyrites, subsequently reacting lime with the said aluminate slag and forming a lime slag, collecting the iron pyrites in the lime slag, and separating and removing the said lime slag from the metal melt.

2. In the production of steel from pig iron, the step of heating molten pig iron free from lime-containing slag with fused, crystalline alumina of purity greater than 90% and producing a spinel-type, iron-aluminate slag, subsequently reacting the iron aluminate slag with lime and forming a lime slag, and separating and removing the said lime slag from the metal melt.

3. In the production of steel by the electric furnace method, the steps of heating fused, crystalline alumina of greater than 90% purity and free from contact with lime containing slag with a ferrous metal melt remaining in an electric furnace after the first slag removed and thereby producing a spinel-type, iron-aluminate slag, reacting said slag with sulfur associated with the ferrous metal melt and forming iron pyrites, subsequently reacting aluminate slag with lime and forming a lime slag, collecting the iron pyrites in the lime slag, and separating and removing the said lime slag from the metal melt.

EDWARD H. GRAF.

REFERENCES CITED

The following references are of record in the file of this patent:

UNITED STATES PATENTS

| Number | Name | Date |
|---|---|---|
| 470,606 | Southerton | Mar. 8, 1892 |
| 1,322,496 | Henderson | Nov. 18, 1919 |
| 1,658,879 | Browne | Feb. 14, 1928 |
| 1,777,081 | Graf | Sept. 30, 1930 |
| 1,890,485 | Amsler | Dec. 13, 1932 |
| 2,102,119 | Henkel | Dec. 14, 1937 |
| 2,283,622 | Boden et al. | May 19, 1942 |

FOREIGN PATENTS

| Number | Country | Date |
|---|---|---|
| 4,625 | Great Britain | of 1879 |

OTHER REFERENCES

Journal of the Iron and Steel Institute (British), vol. CXX, 1929, pages 447 and 448.

Journal of the Iron and Steel Institute (British), vol. CXLVIII, 1943, No. 2, pages 598P to 600P, 666P and 667P.

Stahl and Eisen, vol. 57, 1937, pages 1831 and 1832.